(12) United States Patent
Yim et al.

(10) Patent No.: US 10,037,132 B2
(45) Date of Patent: Jul. 31, 2018

(54) ENLARGEMENT AND REDUCTION OF DATA WITH A STYLUS

(71) Applicant: Samsung Electronics Co., Ltd., Gyeonggi-do (KR)

(72) Inventors: Saemee Yim, Gyeonggi-do (KR); Jinhong Jeong, Gyeonggi-do (KR); Sooji Hwang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 202 days.

(21) Appl. No.: 14/458,362

(22) Filed: Aug. 13, 2014

(65) Prior Publication Data

US 2015/0052477 A1    Feb. 19, 2015

(30) Foreign Application Priority Data

Aug. 19, 2013  (KR) .................... 10-2013-0097637

(51) Int. Cl.
| | | |
|---|---|---|
| *G06F 3/0484* | (2013.01) | |
| *G06F 3/0354* | (2013.01) | |
| *G06F 3/0488* | (2013.01) | |
| *G06F 3/0487* | (2013.01) | |
| *G06F 3/0481* | (2013.01) | |

(52) U.S. Cl.
CPC ...... *G06F 3/04847* (2013.01); *G06F 3/03545* (2013.01); *G06F 3/0481* (2013.01); *G06F 3/0487* (2013.01); *G06F 3/04883* (2013.01); *G06F 2203/04806* (2013.01); *G06F 2203/04807* (2013.01)

(58) Field of Classification Search
CPC ............ G06F 3/04847; G06F 3/03545; G06F 3/04883; G06F 3/0481; G06F 3/0487; G06F 2203/04807; G06F 2203/04806
USPC .......................................... 715/800
See application file for complete search history.

(56) References Cited

U.S. PATENT DOCUMENTS

| | | | |
|---|---|---|---|
| 8,854,433 B1 * | 10/2014 | Rafii ................. | G06F 3/017 348/42 |
| 2001/0012001 A1 * | 8/2001 | Rekimoto ............ | G06F 3/0425 345/173 |
| 2004/0141010 A1 * | 7/2004 | Fitzmaurice .......... | G06F 3/0488 715/810 |
| 2005/0140696 A1 | 6/2005 | Buxton | |
| 2006/0267966 A1 | 11/2006 | Grossman et al. | |
| 2010/0277427 A1 * | 11/2010 | Watanabe ............. | G06F 3/0418 345/173 |
| 2011/0298830 A1 | 12/2011 | Lam | |

(Continued)

FOREIGN PATENT DOCUMENTS

| | | |
|---|---|---|
| KR | 2003-0071080 A | 9/2003 |
| KR | 10-1080676 B1 | 11/2011 |

OTHER PUBLICATIONS

European Search Report dated Mar. 30, 2016.

*Primary Examiner* — John Repsher, III
(74) *Attorney, Agent, or Firm* — Cha & Reiter, LLC (57) ABSTRACT

A device and method for enlarging and reducing data is disclosed. Input from a stylus is detected. It is identified whether the input corresponds to enlargement or reduction of the data. A guide is displayed, when the input corresponds to enlargement or reduction of the data. The data is enlarged or reduced based on the input by the stylus on the guide.

18 Claims, 6 Drawing Sheets

(56) References Cited

U.S. PATENT DOCUMENTS

| | | | |
|---|---|---|---|
| 2012/0154920 A1* | 6/2012 | Harrison | G02B 3/0056 359/619 |
| 2012/0192116 A1 | 7/2012 | Stedman et al. | |
| 2014/0210797 A1* | 7/2014 | Kreek | G06F 3/0488 345/179 |
| 2014/0253463 A1* | 9/2014 | Hicks | G06F 3/03545 345/173 |
| 2014/0253465 A1* | 9/2014 | Hicks | G06F 3/03545 345/173 |
| 2014/0362002 A1* | 12/2014 | Nakasu | G06F 3/0488 345/173 |
| 2014/0362004 A1* | 12/2014 | Doi | G08C 17/00 345/173 |

* cited by examiner

ENLARGEMENT AND REDUCTION OF DATA WITH A STYLUS

CROSS-REFERENCE TO RELATED APPLICATION

This application claims priority from and the benefit under 35 U.S.C. § 119(a) of Korean Patent Application No. 10-2013-0097637, filed on Aug. 19, 2013, which is hereby incorporated by reference herein.

BACKGROUND

1. Field

The present disclosure relates to a method of providing a screen in a device, and more particularly, to a method of providing a screen in a device equipped with a stylus.

2. Description of the Prior Art

Recent developments in electronics have lead to devices that perform various functions. Devices such as smart phones, tablet computers, smart televisions, and the like have become prevalent and are now common in our daily routine. Furthermore, not only can users interact with such devices using their fingers, but users are also capable of interacting with these devices using voice or a screen stylus.

Zoom in and zoom out screen functions are also provided by these devices. The function of zooming in and out of the screen may be conveniently used in a smart phone or tablet computer carried by a user. Zooming in may be implemented, when two fingers on the screen are moved away from each other. Conversely, zooming out may be implemented, when two fingers on the screen are moved toward each other.

Portable devices also support various operations in response to the touch of a stylus, such as drawing a picture, inputting a document, capturing a screen, and the like.

SUMMARY

Unfortunately, zooming in or out of the screen may be difficult or inconvenient when using a stylus. When a user with a stylus wishes to zoom in or out of a screen, the user may be required to stop using the stylus and make multiple touches on the screen with his or her fingers (touching the screen using two different fingers). Therefore, when a user wants to zoom in using his or her fingers, the user may need to hold the stylus somehow or place the stylus at a different place. Thus, a more convenient way of zooming in and out the screen with a stylus is desirable.

Accordingly, an aspect of the present disclosure is to provide a method of providing a screen in a device using a stylus.

Another aspect of the present disclosure is to provide a method of zooming in or out a screen using a stylus in a device having the stylus.

Another aspect of the present disclosure is to provide a method of converting a screen in accordance with a request of a user by recognizing the user in a device having a stylus.

In accordance with one aspect of the present disclosure, a method includes: displaying data on a display module of an electronic device; acquiring a stylus input through the electronic device; determining whether the stylus input corresponds to at least one of enlargement and reduction of the data; displaying a guide corresponding to the determination result; and enlarging or reducing the data based on the stylus input corresponding to the guide.

In accordance with another aspect of the present disclosure, an electronic device includes: a display module for displaying data; an input sensor module for acquiring a stylus input corresponding to the display module; and a control module for determining whether the stylus input corresponds to at least one of enlargement and reduction of the data, displaying a guide corresponding to at least one of the enlargement and the reduction on the display module based on the determination result, and enlarging or reducing the data based on the stylus input corresponding to the guide.

As described above, in accordance with aspects of the present disclosure, in a case of changing a screen using a device, the screen can be easily changed using a stylus. For example, the present disclosure may provide a method of supporting enlargement or reduction of the screen without changing the holding state of the stylus, and a method of enlarging and reducing the screen in accordance with a mode in which the screen is provided in the device, for example, a landscape or portrait mode. This can solve the problem of halting the use of the stylus for the enlargement or reduction of the screen in the device while using the stylus.

BRIEF DESCRIPTION OF THE DRAWINGS

The above features and advantages of the present disclosure will be more apparent from the following detailed description in conjunction with the accompanying drawings, in which.

DETAILED DESCRIPTION

Hereinafter, aspects of the present disclosure will be described with reference to the accompanying drawings. The accompanying drawings are provided to help with comprehension of the present disclosure, and it should be noted that the present disclosure is not limited to the form or arrangement exemplified in the drawings. Furthermore, equivalents or expansions should be construed through the descriptions referring to the drawings.

Figure 1:
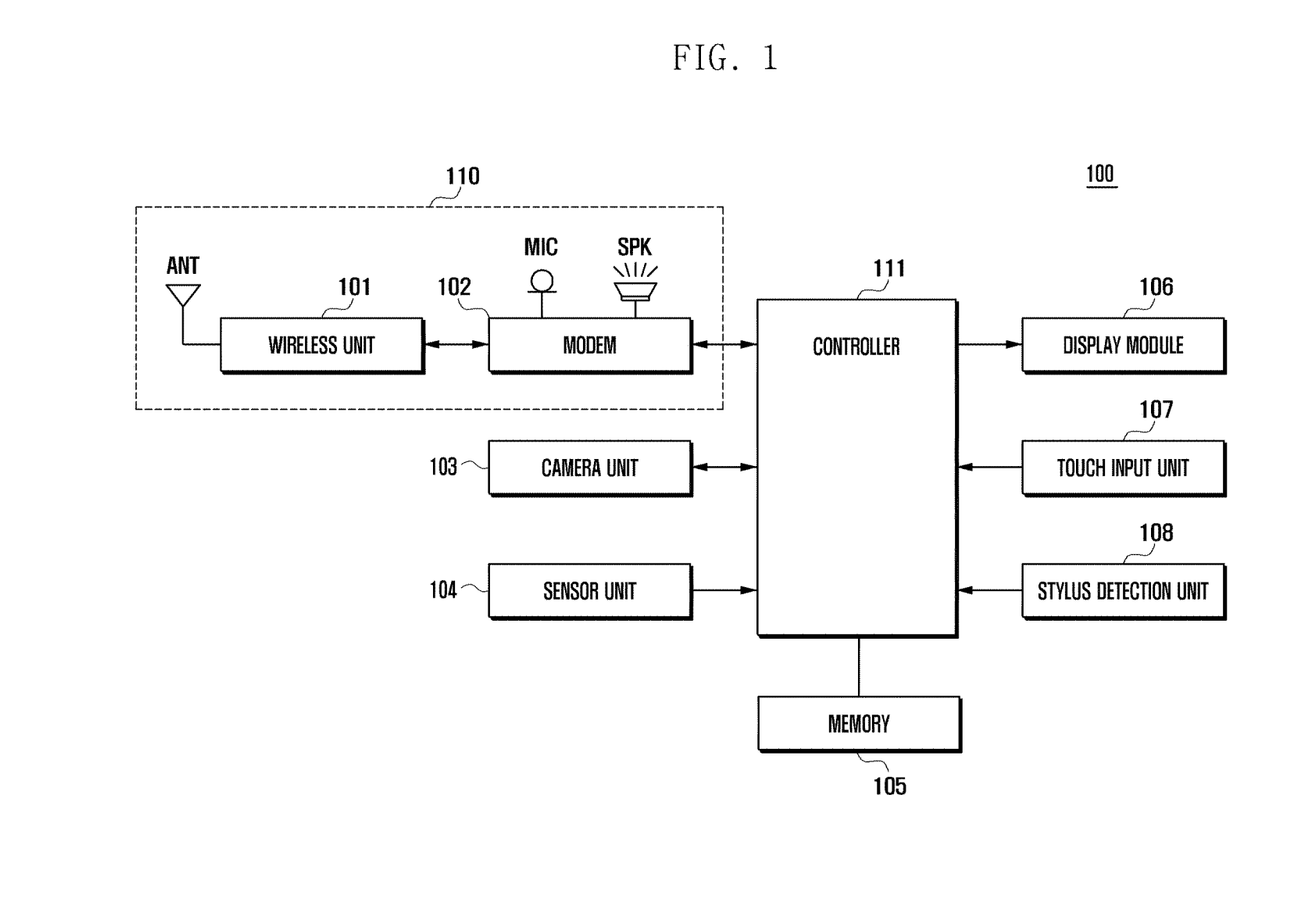
FIG. 1 is a block diagram of an example device in accordance with aspects of the present disclosure.

FIG. 1 is a block diagram of an example device in accordance with aspects of the present disclosure. The electronic device 100 may include a communication module 110, a camera unit 103, a sensor unit 104, a memory 105, a display module 106, a touch input unit 107, a stylus detection unit 108, and a controller 111. Furthermore, the device in accordance with aspects of the present disclosure includes a stylus, and it should be noted that the stylus is not illustrated in FIG. 1. In addition, the device may also further include configuration other than the configurations illustrated in FIG. 1. In the example of FIG. 1, only the configuration illustrated in FIG. 1 will be described below.

Then, a configuration of the communication module 110 will be described. The communication module 110 may include an antenna (ANT), a wireless unit 101, a modem 102, a microphone (MIC), and a speaker (SPK). The antenna (ANT) is manufactured to conform to a frequency band at which a smart phone transmits and receives a frequency signal necessary for communication, and is connected with the wireless unit 101.

The wireless unit 101 up-converts data to be transmitted for voice or/and data communication with a base station or another wireless communication device, and down-converts the received data. For example, the wireless unit 101 up-converts data in a baseband for data transmission, and transmits the up-converted data to the corresponding network through the antenna (ANT). In addition, the wireless unit 101 receives a wireless signal from the corresponding network through the antenna (ANT), and down-converts the received wireless signal to convert it to a baseband signal.

The modem 102 performs data processing such as modulation, demodulation, encoding, and decoding of the transmitted/received data. Since it is assumed that the general device is exemplified in FIG. 1, the modem 102 may include a vocoder for performing modulation, demodulation, encoding, and decoding of a voice signal. The modem 102 receives an electrical voice signal from the microphone (MIC), and converts the received voice signal to a digital voice signal. Furthermore, the modem 102 may convert the digital voice signal which will be output to an electrical analog voice signal, and may output the analog voice signal through the speaker (SPK). Moreover, the modem 102 performs a series of operations such as modulation, demodulation, encoding, and decoding of other used data under the control of the controller 111.

The camera unit 103 may acquire still image data or moving image data by receiving light reflected from a subject through a lens and converting the light reflected from the subject to an electrical signal. The camera unit 103 may convert the acquired still or moving image data to a format of being processed by the controller 111, and may provide the converted data to the controller 111.

The sensor unit 104 may include a geo-magnetic sensor, an infrared sensor, an acceleration sensor, and the like. The sensor unit 104 detects a state in which the smart phone is placed, rotation of the smart phone, a location of a user, and the like, and generates a detection signal to provide the generated signal to the controller 111.

The memory 105 is a storage medium such as a ROM or/and a RAM, and may store various pieces of control data required for an operation of the smart phone and control data for operations in accordance with aspects of the present disclosure. In addition, the memory 105 may include areas for storing user data.

The display module 106 may be configured in the form of an LCD or LED panel, and may display operations required for the device and a status of the device in a standby state under the control of the controller 111. Furthermore, the display module 106 may display an enlarged or reduced screen in accordance with aspects of the present disclosure.

The touch input unit 107 senses a touch action of a user, converts the sensed touch action to a user input signal, and provides the converted user input signal to the controller 111. For example, the touch input unit 107 may collect a touch-down signal based on whether the user makes a touch with one or two fingers and a series of operation information, such as a movement and a touch-up (a release) of the touch in the touched state, and may provide them to the controller 111. At this time, the touch input unit 107 may detect a coordinate value together with the touch-down signal, the movement and touch-up signal of the finger, and may provide the detected coordinate value to the controller 111.

The stylus detection unit 108 may collect information on a touch of a stylus, a movement and a touch up of the stylus in the touched state, hovering of the stylus, a movement of the stylus in the hovering state, a click input of a button included in the stylus, a movement of the stylus while the button is clicked, and a click release of the button included in the stylus, may provide the collected information to the controller 111, and at the same time, may provide coordinates at which the corresponding event is generated to the controller 111.

In one example, the touch input unit 107 may also perform the detection of the events such as the touch-down, the movement and the touch-up of the stylus, and the detection of the corresponding coordinates at which the events are generated, which are performed by the stylus detection unit 108. In this case, the stylus detection unit 108 may also be configured such that the corresponding functions are excluded. However, in the following descriptions, it is assumed that the stylus detection unit 108 and the touch input unit 107 are separately configured for better understanding.

In another example, the display module 106, the touch input unit 107, and the stylus detection unit 108 of the device may be construed as a nested form. For example, when a user touches a location of a picture with his/her hand or a stylus to select one of pictures displayed on the display module 106, the touch input unit 107 or the stylus detection unit 108 may detect coordinates for the location where the corresponding picture is displayed or coordinates for the touch input. Accordingly, when a user touches a specific location in an area displayed on the display module 106 with his/her hand or a stylus, the touch input unit 107 or the stylus detection unit 108 may acquire coordinates of the corresponding location to output the acquired coordinates to the controller 111.

Hovering of a stylus may also be identically understood as described above. For example, when a stylus is spaced apart upward from the display module 106 within a predetermined distance, the touch input unit 107 or the stylus detection unit 108 may acquire coordinates for an acute end portion of the stylus over the display module 106 to provide the acquired coordinates to the controller 111.

Figure 2:
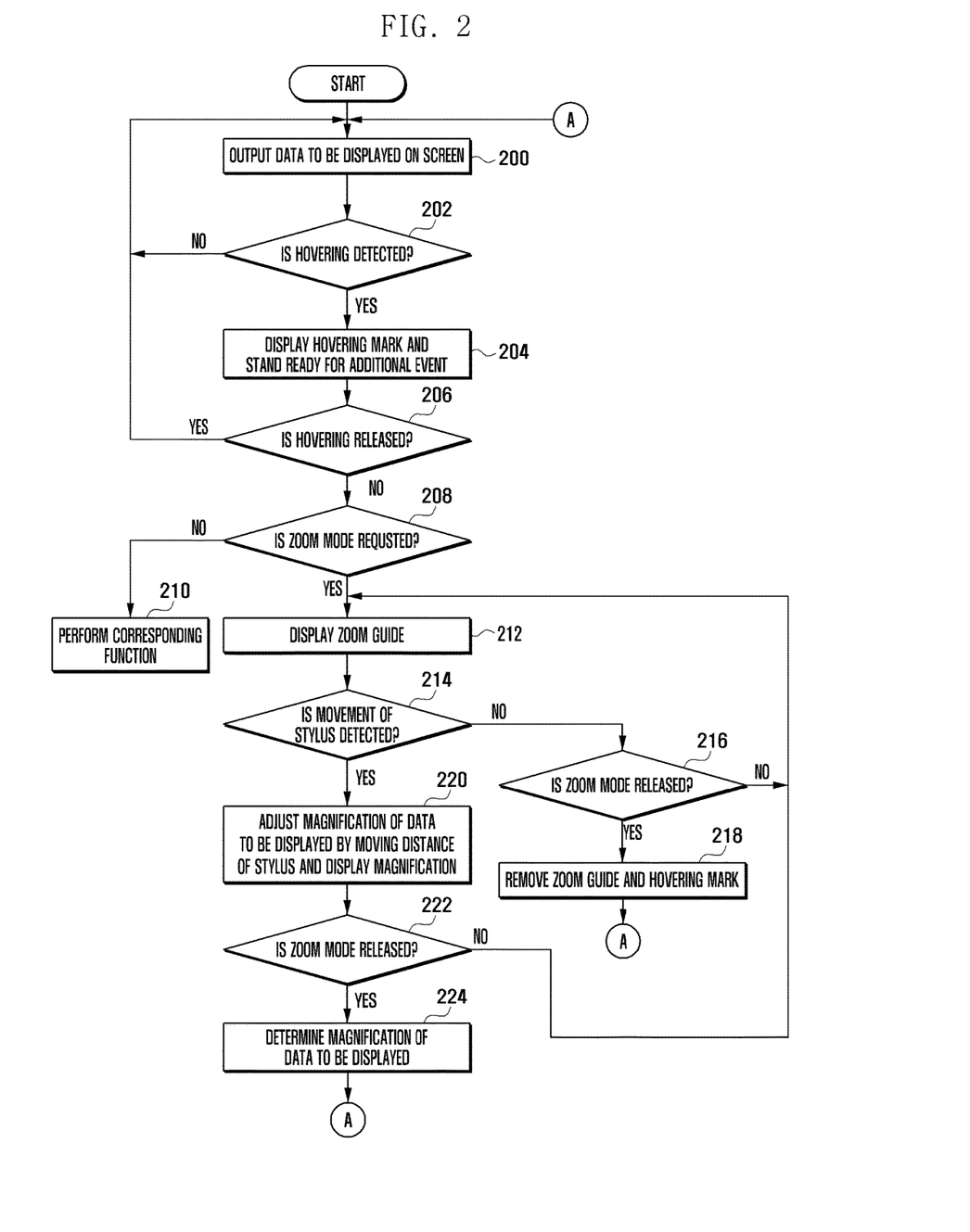
FIG. 2 is a flowchart illustrating an example method for enlarging and reducing a screen in accordance with aspects of the present disclosure.

FIG. 2 is a flowchart illustrating an example method for enlarging and reducing a screen using a stylus in a device in accordance with aspects of the present disclosure. When data is displayed on a display module 106, enlargement or reduction of a screen may correspond to a zoom in and zoom out operation respectively. The enlargement or reduction of data may be carried out whenever display module 106 is activated.

For example, the display module 106 may be deemed activated whenever data is displayed on the screen, such as when the device accesses the Internet and displays a part or the entirety of a specific web page on the screen; loads diary data from a memory 105 and displays the entirety or a part of the diary data on the screen of the display module 106; loads a word document from the memory 105 and displays the entirety or a part of the corresponding document on the screen of the display module 106; displays data provided by a specific application (hereinafter, referred to as 'App') of a smart phone; or, a draws a picture using a specific App. The present disclosure may be performed whenever specific data is output on the screen of the display module 106.

Referring to FIG. 2, in operation 200, a controller 111 may generate data to be displayed on the display module 106, and may output the data on the screen of the display module 106. For example, as described above, any type of data may be displayed. However, for convenience of description, the following description is made assuming that a specific web page is displayed.

In operation 202, the controller 111 determines whether hovering is detected when the data is output on the screen of the display module 106 in operation 200. When it is determined in operation 202 that the hovering has been detected, the controller 111 proceeds to operation 204 to display a hovering mark, in addition to the data output, on the screen of the display module 106 and stand ready for an additional event. However, when it is determined that the hovering has not been detected, the controller 111 keeps displaying content on the screen in operation 200.

In one example, the hovering may be detected when a stylus is placed within a predetermined distance of the device's screen without touching the screen. In another example, the hovering may be detected when an acute end portion of the stylus is placed within a predetermined distance of the display module 106. In a further example, the predetermined distance may be between approximately 1 cm to approximately 2 cm.

When the stylus is placed within a predetermined distance of display module 106, a stylus detection unit 108 may inform controller 111 that a stylus is hovering the screen of display module 106. In addition, stylus detection unit 108 may detect location coordinates of the stylus to provide the detected coordinates to controller 111. Then, controller 111 may additionally display a mark indicating that a stylus hovering the screen has been detected. The mark may be displayed on a position of the screen that corresponds to the detected coordinates of the stylus. The mark may be used to communicate with a user using the hovering stylus. The hovering of the stylus and the operation of communicating with the user by displaying the hovering indicator on the display module 106 will be described in more detail with reference to FIGS. 3A and 3B.

Figure 3A:
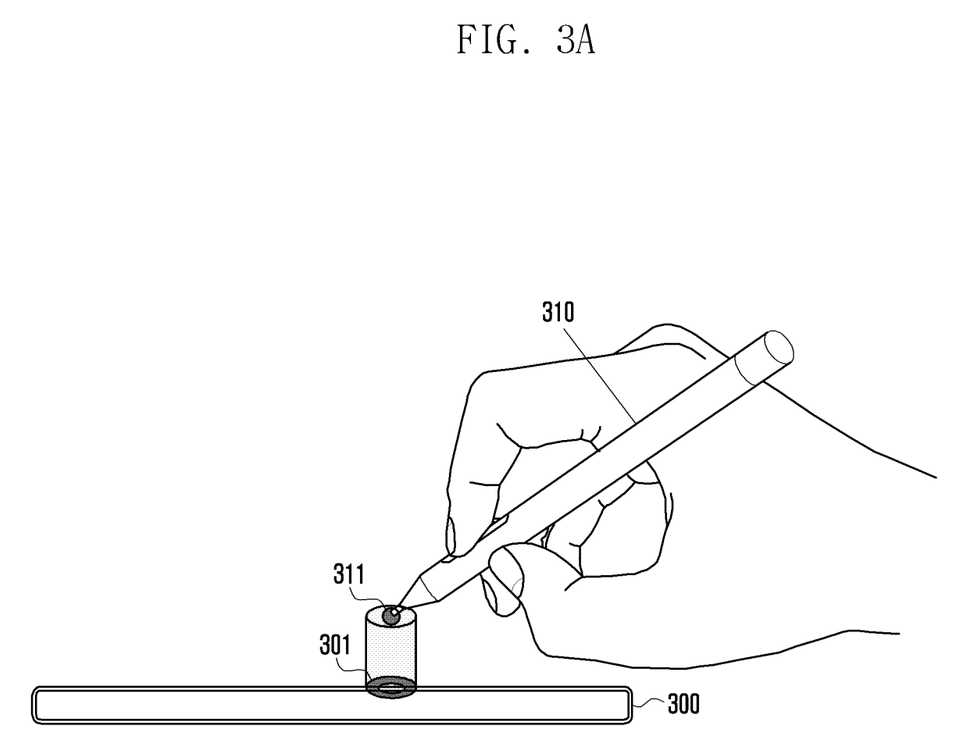
FIG. 3A and FIG. 3B illustrate a working example of a hovering state in accordance with aspects of the present disclosure.
Figure 3B:
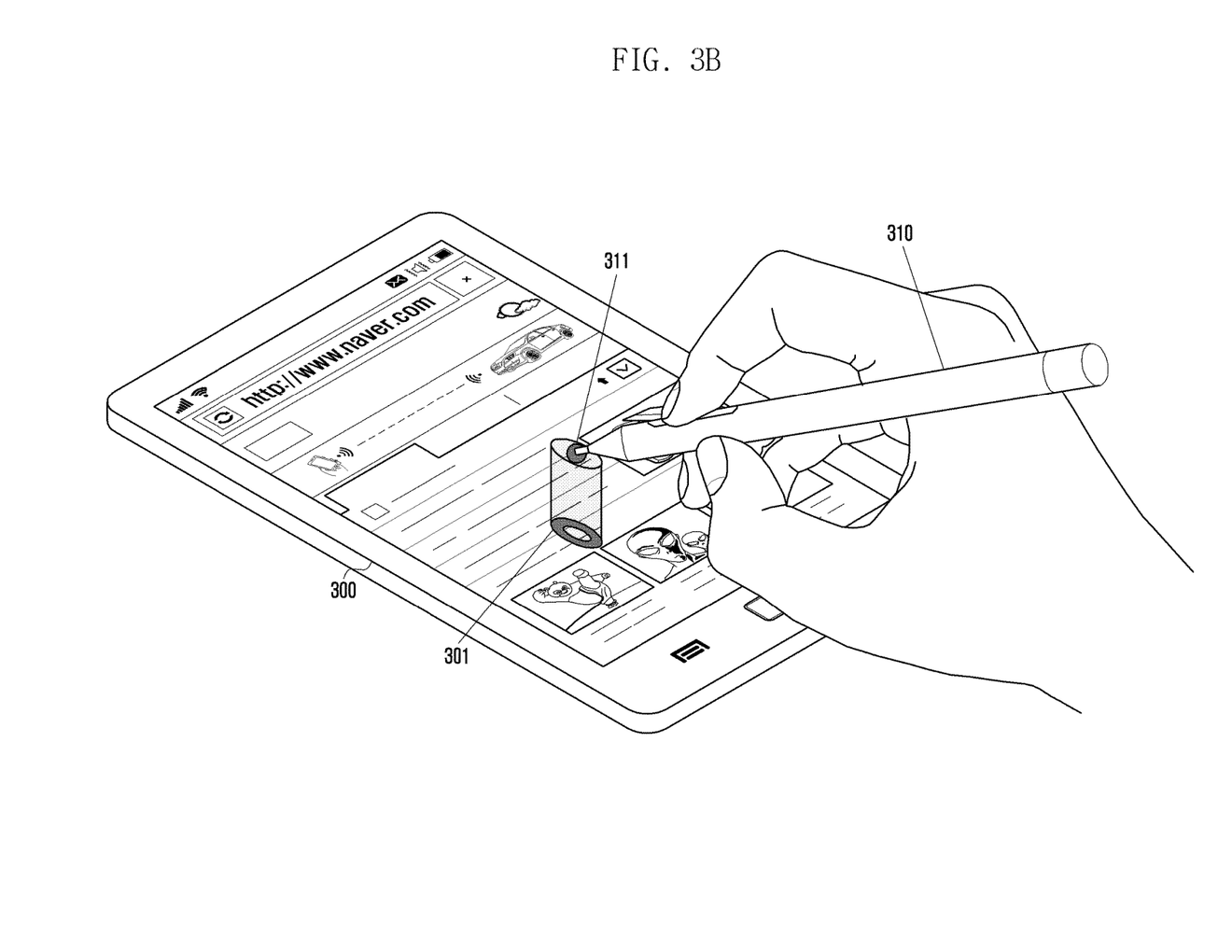

FIGS. 3A and 3B are working examples of a hovering stylus in accordance with aspects of the present disclosure. The hovering stylus may be detected when stylus 310 is within a predetermined distance of display module 106 of device 300. FIGS. 3A and 3B are a side view and a perspective view, respectively, illustrating the stylus 310 hovering over the display module 106 of the device 300.

When stylus 310 is maintained within a predetermined distance of display module 106 for a predetermined time interval t, stylus detection unit 108 may detect location coordinates of an acute end portion 311 of stylus 310 and may provide the coordinates to controller 111. Controller 111 may display a marker indicating the location of the acute end portion 311 in addition to the other data displayed. In FIGS. 3A and 3B, hovering mark 301 indicates the location of acute end portion 311, which is displayed in addition to other data.

When acute end portion 311 of stylus 310 hovers over display module 106 as illustrated in FIG. 3A, the coordinates for the acute end portion 311 may correspond to a point where a vertical line from acute end portion 311 intersects with a surface of the display module 106. This point may be calculated as X and Y coordinates corresponding to the location on the display module 106, and the hovering mark may be located at the point.

Referring back to FIG. 2, controller 111 may display the hovering mark and stand ready for an additional event at operation 204. If a specific event is generated while the controller 111 stands ready for the additional event in operation 204, the controller 111 may proceed to operation 206 to determine whether the generated event is a hovering release. When it is determined in operation 206 that the hovering has been released, controller 111 may remove the hovering mark, and may proceed to operation 200 to continue displaying data on display module 106.

When the generated event is not release of the hovering, controller 111 may determines whether a zoom mode is requested at operation 208. In one example, the zoom mode request may be detected when a button added to the stylus is pushed. When the button added to the stylus is pushed, stylus detection unit 108 may detect the input of the stylus through a frequency change caused by the button input of the stylus. In another example, the input may be entered with a different input device, such as a lever, a wheel, or a touch sensor When the stylus button is pushed while the stylus is hovering over display module 106, the stylus detection unit 108 may provide, to the controller 111, input information of the button and coordinate information of the acute end portion of the hovering stylus. This may inform controller 111 that the zoom mode has been requested.

When it is determined in operation 208 that the zoom mode has been requested, controller 111 may display a zoom guide with the hovering mark on display module 106 as a center point at operation 212. When it is determined in operation 208 that the zoom mode has not been requested, controller 111 may perform any other corresponding function at operation 210. Display of the zoom guide will be described in more detail with reference to FIGS. 4A and 4B.

Figure 4A:
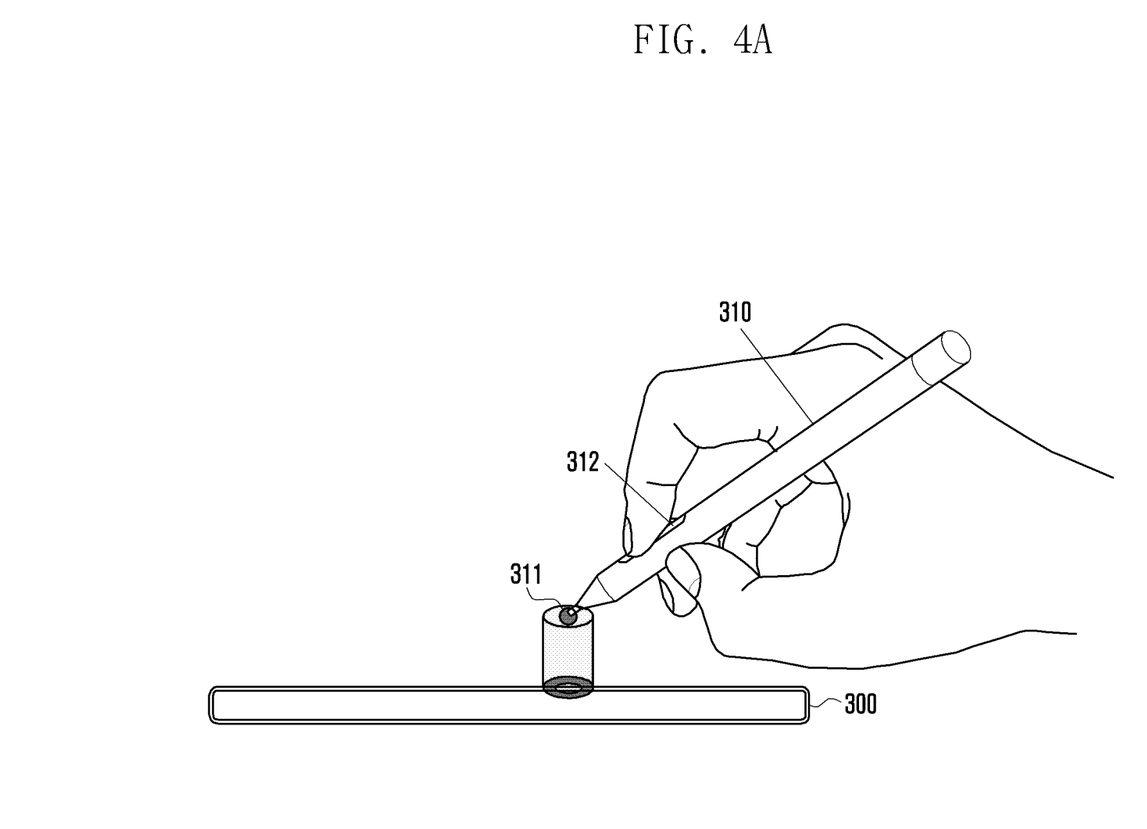
FIG. 4A and FIG. 4B illustrate a working example in which a guide is displayed on a display module in accordance with aspects of the present disclosure.

FIGS. 4A and 4B show a working example of a zoom guide displayed on a display module in accordance with aspects of the present disclosure. Referring to FIG. 4A, acute end portion 311 of stylus 310 hovers over display module 106 of device 300. If a switch 312 attached to stylus 310 is pushed, while acute end portion 311 hovers over display module 106, the stylus detection unit 108 may detect the push of the switch 312. When the push of the switch is detected, the stylus detection unit 108 may detect a signal caused by the push of the switch 312 and may provide the detected signal to controller 111. When controller 111 receives the signal caused by the push of the switch 312, controller 111 may determine that the zoom mode has been requested.

Figure 4B:
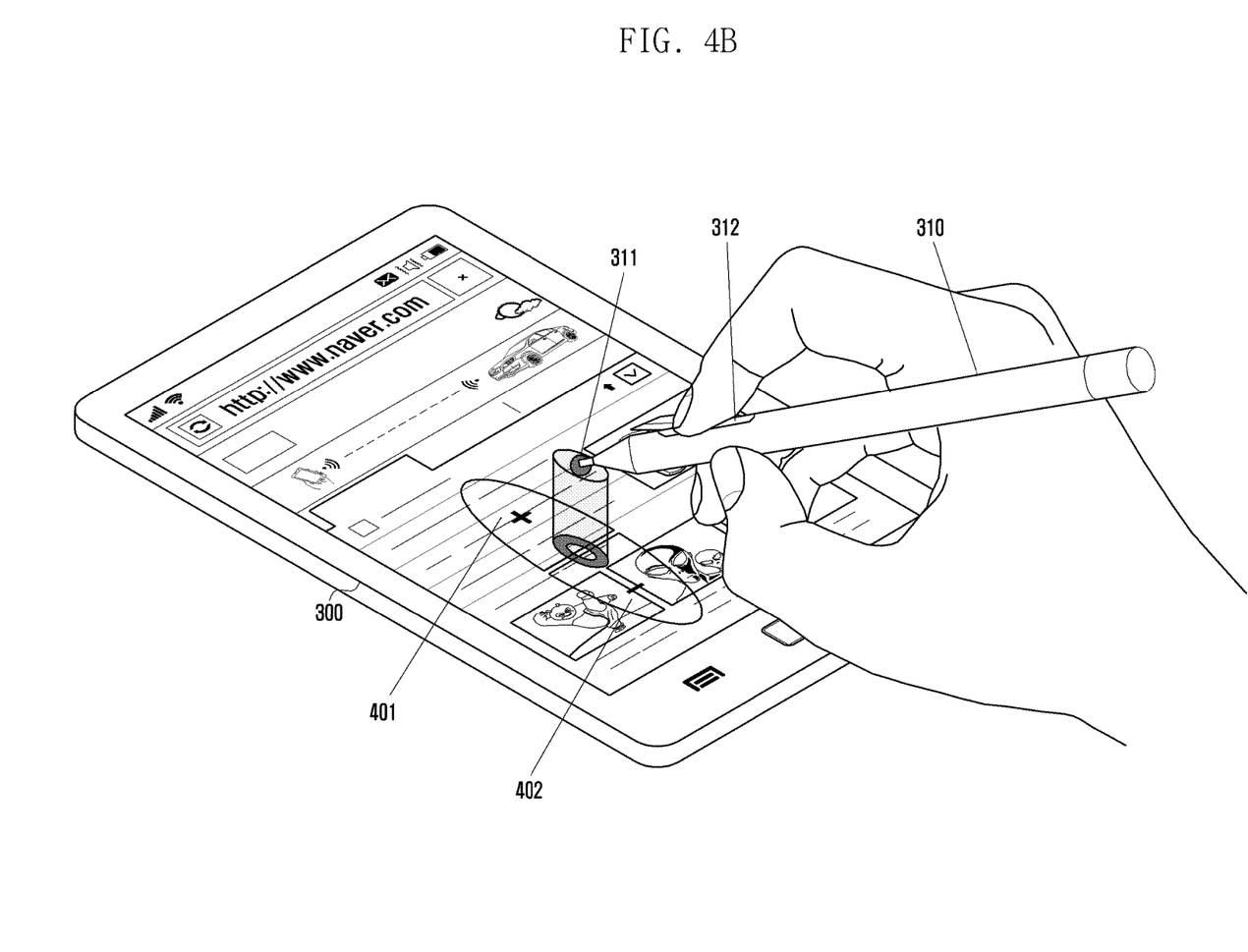

Accordingly, controller 111 may display a zoom guide and the hovering mark while displaying the web page. The zoom guide may comprise a zoom in guide for enlargement and a zoom out guide for reduction. FIG. 4B illustrates an example zoom in guide and zoom out guide. In FIG. 4B, the zoom in guide 401 is displayed in a direction toward an upper end of a screen, and the zoom out guide 402 is displayed in a direction toward a lower end of the screen. The zoom guide with the hovering mark as a center point may be configured with a circle having a predetermined size, and may be divided into two equal parts, namely, an upper end portion and a lower end portion. The upper and lower end portions may be divided using the direction in which data is displayed in the device, a location of the user, and/or the location and the angle of the stylus. The upper and lower end portions may be generally divided based on the direction in which the data is displayed.

For example, the upper and lower end portions of the circle divided as described above may correspond to the zoom in guide and the zoom out guide, respectively. In one example, the upper end portion of the circle is the zoom in guide and the lower end portion of the circle is the zoom out guide. In another example a "+" mark indicating enlargement may be added to an internal area or external adjacent area of the zoom in guide. Furthermore, a "−" mark indicating reduction may be added to an internal area or external adjacent area of the zoom out guide. In addition, to easily distinguish between enlargement and reduction, appropriate colors indicating enlargement and reduction may be added to an interior of the zoom in guide 401 and the zoom out guide 402. The appropriate colors may be any desired color. For example, red-based colors may be displayed to indicate enlargement and blue-based colors may be displayed to indicate reduction.

As noted above, the zoom in guide 401 may be displayed in the direction toward the upper end of the screen and the zoom out guide 402 may be displayed in the direction toward the lower end of the screen. However, the zoom in guide and the zoom out guide may be displayed in opposite positions. Furthermore, the zoom in guide and the zoom out guide may also be displayed in the left and right ends of the screen, respectively. The position in which the zoom in and zoom out guides are displayed may be chosen in view of various factors.

In one example, the zoom in guide and the zoom out guide may be displayed in view of a location of a user. A location and an angle of a user having a stylus, and a state in which the stylus is held by the hand may be detected through a camera unit 103 and a sensor unit 104. Furthermore, it is possible, to detect and measure a tilt of the stylus or a location and a shape of the hand through a touch panel. The controller 111 may obtain a direction of the user having the stylus by using the detected information. Accordingly, the controller 111 may display the zoom in guide and the zoom out guide in accordance with the location of the user having the stylus. For example, if it is convenient for a user to move his/her hand upward and downward, the zoom in/out guides may be displayed in an up-down direction of the screen, and if it is convenient for a user to move his/her hand left and right, the zoom in/out guides may be displayed in a left-right direction of the screen.

In one example, the zoom in/out guides may be displayed in accordance with a location where the stylus 310 is hovering. For example, when the hovering location is excessively biased toward the upper or lower end of the display module 106 and the hovering may be easily moved left and right, the zoom in/out guides may be displayed in a left-right direction of the screen. When the hovering location is excessively biased to a left or right side of the display module 106 and the hovering may be easily moved upward and downward, the zoom in/out guides may be displayed in an up-down direction of the screen.

In another example, a user may arbitrarily change the direction of the zoom in/out guides. For example, when the user determines that an up-down movement is convenient, the direction of the zoom in/out guides in the hovering state may be configured in advance as an up-down direction in the system configuration. Alternatively, when the user determines that a left-right movement is convenient, the direction of the zoom in/out guides in the hovering state may be configured in advance as a left-right direction in the system configuration. When the direction of the zoom in/out guides are configured in the up-down direction, the direction toward the upper side of the screen may be configured as a direction in which the screen is enlarged or may also be configured in a direction in which the screen is reduced. In the same way, this may also be applied to the case where the direction of the zoom in/out guides is configured as the left-right direction. User convenience may be provided through this. For example, a user may set zoom in/out guides displaying direction, before using the device, where a zoom in guide is displayed in an upward direction on the display and a zoom out guide is displayed in a downward direction on the display through a manipulation of user setting. For example, regardless of whether the user is a right-hander or a left-hander, the user may directly configure the zoom in/out guides to be displayed in a manner that is most convenient.

Referring back to FIG. 2, controller 111 may determine whether a movement of the stylus is detected through the stylus detection unit 108 at operation 214. If it is determined in operation 214 that the movement of the stylus has been detected through the stylus detection unit 108, the controller 111 proceeds to operation 220, and if not, the controller 111 proceeds to operation 216.

At operation 216, controller 111 determines whether the zoom mode was released. The release of the zoom mode is opposite to the request of the zoom mode. For example, the release of the zoom mode may indicate that switch 312 of stylus 310 is released. The request and release of the zoom mode may be implemented in different ways. For example, switch 312 may be pushed once and then released to indicate a request for the zoom mode. If switch 312 is pushed and released again after a predetermined period of time elapses, a request for release of the zoom mode may be indicated. Therefore, a request for the zoom mode and a request for release of the zoom mode may be indicated in different ways. For ease of illustration, the following description assumes that the zoom mode request is made with the switch 312 of stylus 310.

When release of the zoom mode is requested, controller 111 may remove the zoom guide and the hovering mark 301 from display module 106 at operation 218. Controller 111 may then display other data on display module 106 at operation 200 such that the zoom guide and the hovering mark are no longer displayed.

In certain examples hovering mark 301 may not be removed, when release of the zoom mode is requested. In this instance, controller 111 may execute operation 204 rather than operation 200.

In a further example, when the movement of the stylus is detected in operation 214, controller 111 may read the moving distance of stylus 310 detected by stylus detection unit 108. The moving distance of stylus 310 detected by stylus detection unit 108 may be a moving distance of the acute end portion 311 of stylus 310. The controller 111 may determine an enlargement/reduction magnification using the moving distance of the acute end portion 311 of stylus 310 at operation 220. The magnification may be based at least partially on a predetermined magnification table. An example magnification table is shown in Table 1 below.

TABLE 1

| MOVING DISTANCE | ENLARGEMENT | REDUCTION |
|---|---|---|
| SMALLER THAN 5 mm | 120% | 90% |
| FROM 5 mm TO 10 mm | 150% | 70% |
| FROM 10 mm TO 15 mm | 200% | 50% |
| . | . | . |
| . | . | . |
| . | . | . |

In Table 1, the enlargement or reduction magnification is determined based at least partially on the moving distance of the acute end portion 311 from hovering mark 301. The zoom in (enlargement) may be triggered when the acute end portion of the stylus moves where the zoom in guide is displayed, and the zoom out (reduction) may be triggered when the acute end portion of the stylus moves where the zoom out guide is displayed. Here, the moving distance of the acute end portion 311 of the stylus may imply a straight-line distance.

Referring to Table 1, when the acute end portion 311 of the stylus 310 moves by a distance of 8 mm in the zoom in (enlargement) direction, the displayed data, having the default magnification, is requested to be enlarged by 150%. On the contrary, when the acute end portion 311 of the stylus 310 moves by a distance of 12 mm in the zoom out (reduction) direction, the displayed data having the default magnification is requested to be reduced by 50%.

The data of Table 1 is provided as an example. It is understood that the table may be configured differently based at least partially on the screen size of a given device. For example, when the screen size of display module 106 is 4 inches or 10 inches, the magnification may be changed accordingly. Touch input unit 107 and stylus detection unit 108 may have a size identical or proportional to that of the display module 106.

In another example, a user may determine the enlargement/reduction magnification of the magnification table. Furthermore, in order to allow a user to easily know in advance the enlargement and/or reduction magnification value, the magnification illustrated in Table 1 may be displayed within the zoom guide or in a specific area displayed on the display module 106. That is, the enlargement/reduction magnification may be displayed in the predetermined specific area in accordance with the movement of the stylus.

In another example, the magnification may be immediately changed in response to the moving distance without using the magnification table, and the changed magnification may be displayed on the display module 106. In this instance, a default moving distance may be configured. In one example, the default moving distance may be approximately 1 mm or approximately 3 mm. Whenever a movement is made with a stylus, controller 111 may enlarge and/or reduce the displayed data using the default. For example, when the default moving distance is approximately 3 mm, whenever a movement is made by approximately 3 mm, data may be enlarged or reduced by 5% or 10%.

In one example, in order to make the enlargement/reduction look more natural, the default moving distance may be more precise, such as approximately 1 mm or approximately 2 mm, rather than 3 mm or 5 mm.

In another example, the table and the default may be used together. For example, an enlargement/reduction magnification may be displayed in accordance with a default, and at the same time, a new enlargement/reduction magnification may be determined in response to a moving distance of the stylus based on the values in a preconfigured table.

In one example, data having a default magnification may be enlarged or reduced with the hovering mark serving as a reference point. For example, controller 111 may generate enlarged/reduced data such that the hovering mark is located at the center after the data is enlarged or reduced.

In an alternate example, the reference point may remain still regardless of the enlargement/reduction. For example, after the data is enlarged or reduced with respect to the hovering mark, the hovering mark may be situated at its original location before the data was enlarged or reduced. In this instance, the hovering mark is not changed and the screen provided to the user does not rapidly changed, which may be more convenient for a user.

Referring back to FIG. 2, at operation 222, controller 111 may determine whether the release of the zoom mode is requested. The request for release of the zoom mode may be triggered by releasing switch 312 of stylus 310. When it is determined in operation 222 that the release of the zoom mode has been requested, controller 111 may adjust the magnification of the displayed data to the requested magnification or determine the magnification of the displayed data at operation 224. When it is determined in operation 222 that the release of the zoom mode has not been requested, controller 111 may continue displaying the zoom guide on display module 106, at operation 212.

In one example, a method of displaying data of the electronic device 100 may include displaying data on a display, such as display module 106, of an electronic device; detecting input from a stylus 310; identifying whether the input corresponds to enlargement or reduction of the data; displaying a guide (e.g., 401 and 402), when the input corresponds to enlargement or reduction of the data; and enlarging or reducing the data based on the input by the stylus on the guide.

In another example, identifying whether the input is for enlargement or reduction may be based on input information from a switch 312 configured in the stylus 310. In yet a further example, identifying whether the input is for enlargement or reduction may be based on a hovering state of the stylus 310. In another aspect, the enlarging or reducing of the data may include enlarging or reducing the data based on movement detected from the stylus.

In a further aspect, displaying of the guide (e.g., 401 and 402) may include displaying a guide for enlargement and a guide for reduction such that at least part of the guide for enlargement and at least part of the guide for reduction are symmetric to each other. In yet another aspect, the enlarging or reducing of the data may include determining an enlargement or reduction magnification based on at least one of: the moving distance and/or the speed of the stylus input. In another example, the determined magnification may be displayed.

In a further example, the method of displaying the data may further include identifying a location of a user using information from at least one input module (e.g., 103, 104, 107, and 108) contained in the electronic device. In yet another example, wherein identifying the user's location may include identifying the user's location based on an image obtained with an image acquisition or camera unit 103 of the electronic device. In a further aspect, the method may include determining a direction of the guide 401 and 402 based on the location of the user. In another example, the guide 401 for enlargement may be located farther from the location of the user than the guide 402 for reduction.

In yet a further example, the guide may be removed, when certain input from the stylus is detected. In another example, the certain input detected from the stylus may comprise a release of the switch configured in the stylus 310 and contact of the stylus on the display (e.g., a case where an acute end portion 311 of the stylus contacts the display module 106).

In another aspect, an electronic device 100 may include: a display; a controller to: display data on the display; detect input from a stylus; identify whether the input corresponds to enlargement or reduction of data; display a guide, when the input corresponds to enlargement or reduction of the data; and enlarge or reduce the data based on the input by the stylus on the guide.

In yet a further aspect, an input sensor module may determine whether the stylus input is a hovering input based on whether the stylus contacts the display module (e.g., a case where an acute end portion 311 of the stylus contacts the display module 106).

In one example, the electronic device 100 may determine a position of the guide on the display based on input from a switch added to the stylus, when it is determined that the stylus input is the hovering input.

In a further example, the electronic device may detect a location of a user based at least partially on information from at least one input module. In another aspect, the electronic device may determine a direction in which to display the guide based at least partially on setting information of the electronic device or a location of a user.

In yet another example, a non-transitory computer readable medium with instructions stored therein may upon execution instruct a device to: detect input from a stylus; identify whether the input corresponds to enlargement or reduction of data; display a guide (e.g., 401 and 402), when the input corresponds to enlargement or reduction of the data; and enlarge or reduce the data based on the input by the stylus on the guide.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

What is claimed is:

1. A method comprising:
    displaying data on a display of an electronic device; and
    in response to detecting a hovering input from a stylus activated by a user over the display:
        identifying a hovering location of the stylus over the display;
        displaying a hovering mark on the display at a location on the display that corresponds with the hovering location of the stylus over the display;
        receiving a first input from the stylus;
        identifying whether the first input corresponds to a request for a zoom mode;
        when the first input corresponds to the request for the zoom mode, displaying a zoom guide comprising the hovering mark displayed at a center of the zoom guide and a guide for enlargement and a guide for reduction displayed symmetrically on opposite sides of the hovering mark;
        comprises when the hovering location of the stylus is biased toward a top edge of the display or a bottom edge of the display, orienting the zoom guide in a first orientation so that an enlargement or reduction input comprises movement of the stylus towards a left edge of the display or a right edge of the display;
        when the hovering location of the stylus is biased toward the left edge of the display or the right edge of the display, orienting the zoom guide in a second orientation so that the enlargement or reduction input comprises movement of the stylus towards the top edge of the display or the bottom edge of the display;
        when a second input comprising movement of the stylus over the zoom guide is received, determining whether the second input corresponds to a request for enlargement or a request for reduction based on a moving direction of the second input, determining an enlargement or reduction magnification amount relative to a moving distance of the second input from the hovering mark, and performing one of enlarging the data or reducing the data; and
        when it is determined that a release of the zoom mode is requested, removing the zoom guide and the hovering mark from the display.

2. The method of claim 1, wherein identifying whether the first input is requesting the zoom mode is based on input information from a switch configured in the stylus.

3. The method of claim 1, wherein enlarging or reducing the data comprises:
    determining the enlargement or reduction magnification amount relative to a speed of the stylus.

4. The method of claim 3, further comprising:
    displaying the enlargement or reduction magnification amount on the display.

5. The method of claim 1, further comprising:
    identifying a location of the user relative to the electronic device using information from at least one input module contained in the electronic device.

6. The method of claim 5, wherein identifying the location of the user comprises:
    detecting an image using an image acquisition unit of the electronic device.

7. The method of claim 5, further comprising:
    identifying a direction of the zoom guide based on the location of the user relative to the electronic device.

8. The method of claim 7, further comprising:
    displaying the zoom guide such that the guide for enlargement is located farther from the location of the user relative to the electronic device than the guide for reduction.

9. The method of claim 1, wherein the release of the zoom mode is detected based on a third input detected from the stylus.

10. The method of claim 9, wherein the third input detected from the stylus comprises a release of a switch configured in the stylus and/or contact of the stylus on the display.

11. An electronic device comprising:
    a display; and
    a processor configured to:
        display data on the display;
        in response to detecting a hovering input from a stylus activated by a user over the display:
            identify a hovering location of the stylus over the display;

display a hovering mark on the display at a location on the display that corresponds with the hovering location of the stylus over the display;
receive a first input from the stylus;
identify whether the first input corresponds to a request for a zoom mode;
when the first input corresponds to the request for the zoom mode, display a zoom guide comprising the hovering mark displayed at a center of the zoom guide and a guide for enlargement and a guide for reduction displayed symmetrically on opposite sides of the hovering mark;
when the hovering location of the stylus is biased toward a top edge of the display or a bottom edge of the display, orient the zoom guide in a first orientation so that an enlargement or reduction input comprises movement of the stylus towards a left edge of the display or a right edge of the display;
when the hovering location of the stylus is biased toward the left edge of the display or the right edge of the display, orient the zoom guide in a second orientation so that the enlargement or reduction input comprises movement of the stylus towards the top edge of the display or the bottom edge of the display;
when a second input comprising movement of the stylus over the zoom guide is received, determine whether the second input corresponds to a request for enlargement or a request for reduction based on a moving direction of the second input, determine an enlargement or reduction magnification amount relative to a moving distance of the second input from the hovering mark, and perform one of enlarging the data or reducing the data; and
when it is determined that a release of the zoom mode is requested, remove the zoom guide and the hovering mark from the display.

12. The electronic device of claim 11, wherein the processor is further configured to determine a position of the zoom guide on the display based on input from a switch configured in the stylus, when it is determined that the stylus is in a hovering state.

13. The electronic device of claim 11, wherein the processor is further configured to detect a location of the user relative to the electronic device based at least partially on information from at least one input module.

14. The electronic device of claim 13, wherein the processor is further configured to determine a direction in which to display the zoom guide, based on the location of the user relative to the electronic device.

15. The electronic device of claim 11, wherein the processor is further configured to determine a direction in which to display the zoom guide based at least partially on setting information of the electronic device or a location of the user.

16. A non-transitory computer readable medium with instructions stored therein which upon execution instructs a device to:
display data on a display;
in response to detecting a hovering input from a stylus activated by a user over the display:
identify a hovering location of the stylus over the display;
display a hovering mark on the display at a location on the display that corresponds with the hovering location of the stylus over the display;
receive a first input from the stylus;
identify whether the first input corresponds to a request for a zoom mode;
when the first input corresponds to the request for the zoom mode, display a zoom guide comprising the hovering mark displayed at a center of the zoom guide and a guide for enlargement and a guide for reduction displayed symmetrically on opposite sides of the hovering mark;
when the hovering location of the stylus is biased toward a top edge of the display or a bottom edge of the display, orient the zoom guide in a first orientation so that an enlargement or reduction input comprises movement of the stylus towards a left edge of the display or a right edge of the display;
when the hovering location of the stylus is biased toward the left edge of the display or the right edge of the display, orient the zoom guide in a second orientation so that the enlargement or reduction input comprises movement of the stylus towards the top edge of the display or the bottom edge of the display;
when a second input comprising movement of the stylus over the zoom guide is received, determine whether the second input corresponds to a request for enlargement or a request for reduction based on a moving direction of the second input, determine an enlargement or reduction magnification amount relative to a moving distance of the second input from the hovering mark, and perform one of enlarging the data or reducing the data displayed on the display; and
when it is determined that a release of the zoom mode is requested, remove the zoom guide and the hovering mark from the display.

17. The method of claim 1, wherein identifying whether the second input corresponds to the request for enlargement or the request for reduction is based on a hovering state of the stylus.

18. The electronic device of claim 11, wherein the processor is further configured to detect whether the second input is a second hovering input.

* * * * *